March 6, 1928. 1,661,814
C. W. TODD
MEANS FOR CONTROLLING THE SWIVELING ACTION OF RAILWAY TRUCKS
Filed May 7, 1926
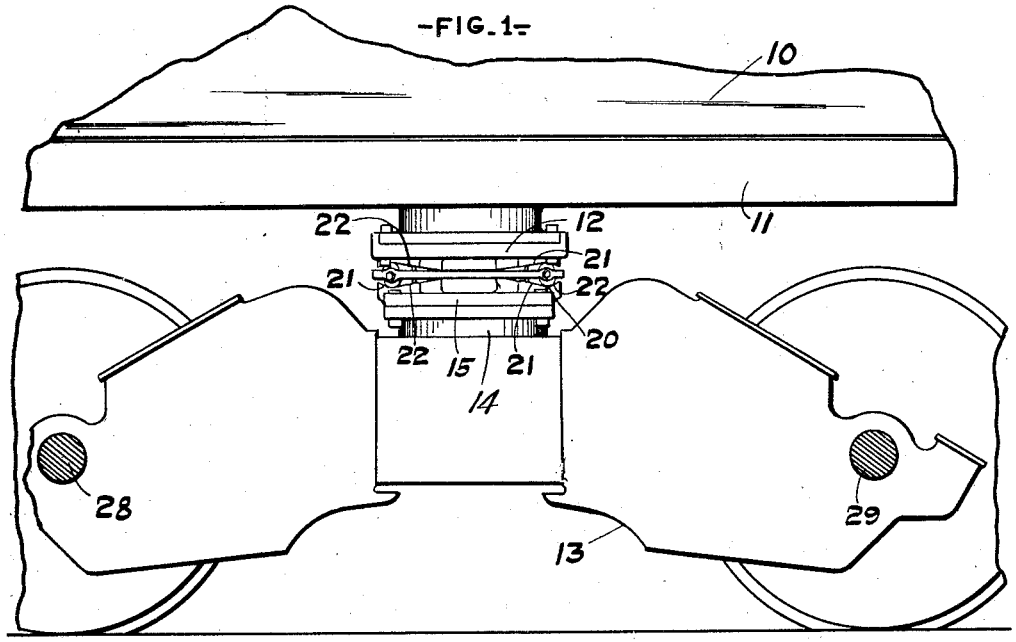
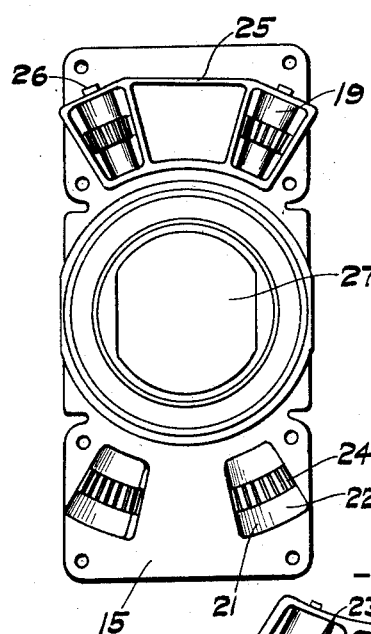
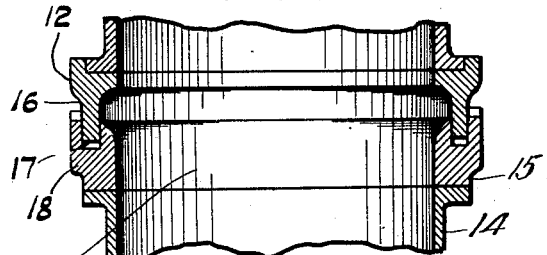
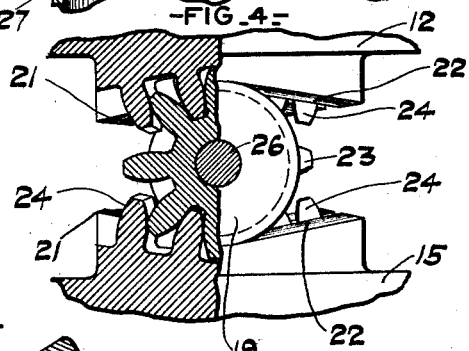
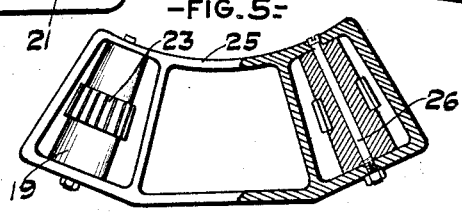
INVENTOR.
Charles W. Todd
BY Clarence Kerr
ATTORNEYS.

Patented Mar. 6, 1928.

1,661,814

UNITED STATES PATENT OFFICE.

CHARLES W. TODD, OF SCHENECTADY, NEW YORK.

MEANS FOR CONTROLLING THE SWIVELING ACTION OF RAILWAY TRUCKS.

Application filed May 7, 1926. Serial No. 107,312.

My invention relates to the connecting elements or center plates used between the bodies and supporting trucks of railway vehicles. A general object of the invention is to provide means for resisting or opposing relative rotation of the body plate and truck plate elements except as swiveling action is necessitated by curves in the track. To this end the confronting faces of the associated plate members are provided with reversely inclined surfaces separated by rollers, the foundation of the surfaces tending, through their interengagement with the rollers, to utilize the weight of the superstructure to maintain themselves in a centered or fixed relative orientation or position. As a result oscillating movements of the truck about a vertical axis are prevented and steadiness of travel of the truck and the vehicle body is maintained. The invention includes other features which will be hereinafter described and claimed.

The improvement claimed is hereinafter fully set forth.

In the accompanying drawings: Figure 1 is a view, partly in side elevation, and partly in longitudinal vertical section, of a portion of an electric locomotive, embodying my invention; Fig. 2, a plan view, on an enlarged scale, of the lower centre plate, showing a pair of geared rollers in place thereon; Fig. 3, a longitudinal central vertical section, on a further enlarged scale, showing the swivel connection between the two centre plates; Fig. 4, a view, partly in longitudinal vertical section, and partly in side elevation, showing details of the geared roller construction; and, Fig. 5, a view, partly in plan, and partly in horizontal section, of a pair of rollers and their frame.

In the practice of my invention, referring descriptively to the specific embodiment thereof which is herein exemplified as applied to a railroad vehicle the vehicle body, 10 is mounted on an underframe 11 which carries a center plate member 12. A wheeled truck 13 includes a bolster 14 which is provided on its upper face with a center plate member 15. The body center plate 12 is provided with a downwardly extending annular flange 16 which is arranged to enter an annular slot 17 provided in a bearing member 18 carried by the truck center plate 15. With this structural relation between the parts the bearing member 18 is free to rotate with relation to the flange 16 to thereby provide for a swiveling action of the truck 13 with relation to the body 10.

A feature of the invention herein resides in the provision of means for opposing or resisting turning or swiveling movement of the truck out of a normal alined relation to the body of the vehicle. The effect of this is to provide steadiness and smoothness of travel of the vehicle and to increase in general the efficiency of operation. The devices used for the purpose take the form of anti-friction rollers 19 mounted between and in rolling engagement with the confronting surfaces of the center plate members 12 and 15 already referred to. In order to produce the desired resistance to relative rotation of the center plates, the roller engaged surfaces are provided with seats formed between oppositely inclined surface sections 21 and 22 in each plate. The re-entrant angles thus formed in each plate are disposed in opposite relation to the seating angles in the other plate so that, in the normal position of the truck the rollers are seated in the opposite angles which form the seats therefor. It will be seen that any angular movement of the truck center plate with relation to the body center plate, such as is produced when the vehicle travels on a curved section of track, can be effected only by movement of the roller between converging or opposing surfaces which results in a lifting action applied to the body structure. It will thus be seen that the weight of the vehicle body or superstructure 10 is applied to resist movement of the truck out of a normal position in alinement with the body.

In order to insure rolling action of the rollers 19 I preferably provide each roller with a toothed section 23 which is adapted to have meshing engagement with a toothed or rack section 24 provided in the inclined surface sections 21 and 22 of the roller-engaging surfaces of the plate members 12 and 15. The toothed sections are shown as located in a middle portion of the length of the rollers and seating surfaces but they may be otherwise disposed as circumstances may require in practice.

The rollers 19, which are shown to have a tapered or frusto-conical formation are preferably used in two sets or pairs mounted in frames or yokes 25. Bolts 26 passing axially through the rollers 19 form arbors therefor and prevent other than rotative movement of the rollers with relation to the yokes. With this arrangement positive and simultaneous operation of the rollers in each set is assured.

The invention, while adapted for general use in railway vehicles is particularly adapted for use with electric locomotives. In this connection the passageway 27 provided by the annular bearing connection between the centerplates 12 and 15 may be effectively utilized as part of an air conduit through which a stream of air is blown into the hollow bolster—and forwardly and rearwardly therefrom to cool electric motors (not shown) having direct driving connection with the axles 28 and 29.

It will be seen that I have provided for yieldingly resisting angular or swiveling motion of a railway vehicle truck to thereby cause the truck to persist in occupying a normal position in alinement with the body and to return to that position when displaced therefrom.

I claim as my invention and desire to secure by Letters Patent:

In a centre bearing for railroad vehicles, the combination of an upper bearing plate, for attachment to a body bolster, and a lower bearing plate, for attachment to a truck bolster, one of the plates having an annular groove, and the other plate having an annular flange adapted to fit within the groove, to form a swivel connection between the plates, each plate being provided, at its opposite ends, with a plurality of roller bearing seats, each seat comprising a rack having oppositely inclined portions, and oppositely inclined smooth bearing portions, on each side of the rack; a plurality of rollers, one for each seat, each roller, having an intermediate portion formed with teeth adapted to mesh with the teeth of the rack, and smooth tapered portions on each side of the intermediate portion, adapted to roll on the inclined smooth portions of the seats, when the plates swivel; and a frame at each end of the plates in which all of the rollers, at the respective ends, are rotatably mounted.

CHARLES W. TODD.